(12) United States Patent
Tsutsumi et al.

(10) Patent No.: US 7,704,385 B2
(45) Date of Patent: Apr. 27, 2010

(54) WATER TREATMENT SYSTEM

(75) Inventors: Masahiko Tsutsumi, Fuchu (JP);
Nobuyuki Ashikaga, Kawasaki (JP);
Yasuhiko Nagamori, Fuchu (JP);
Takumi Obara, Fuchu (JP); Takashi Menju, Kawasaki (JP); Katsuya Yamamoto, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 320 days.

(21) Appl. No.: 11/797,671

(22) Filed: May 7, 2007

(65) Prior Publication Data
US 2007/0267345 A1 Nov. 22, 2007

(30) Foreign Application Priority Data
May 22, 2006 (JP) ............................. 2006-142077

(51) Int. Cl.
*C02F 3/00* (2006.01)
(52) U.S. Cl. ........................ 210/150; 210/151
(58) Field of Classification Search .................. 210/605, 210/150–151
See application file for complete search history.

(56) References Cited

U.S. PATENT DOCUMENTS

| 5,462,657 | A * | 10/1995 | Rizk et al. | 210/170.06 |
|---|---|---|---|---|
| 2004/0029267 | A1* | 2/2004 | Martin et al. | 435/299.1 |
| 2005/0006304 | A1* | 1/2005 | Ames et al. | 210/602 |
| 2006/0254978 | A1* | 11/2006 | Ames et al. | 210/609 |
| 2007/0227972 | A1* | 10/2007 | Buelna et al. | 210/617 |

FOREIGN PATENT DOCUMENTS

| JP | 11-285696 | | 10/1999 |
|---|---|---|---|
| JP | 11-285696 | A | 10/1999 |
| JP | 2003-236582 | A | 8/2003 |
| KR | 10 1991-0006150 | A | 4/1991 |
| KR | 10 2002-0044193 | | 6/2002 |

OTHER PUBLICATIONS

Korean Intellectual Property Office Notification of the First Office Action for Patent Application No. 200710104190.1, dated Dec. 26, 2008 (4 pages).
Korean Intellectual Property Office Notice of Allowance for Patent, Application No. 10-2007-0049227, May 30, 2008 (1 page).

* cited by examiner

*Primary Examiner*—Chester T Barry
(74) *Attorney, Agent, or Firm*—Finnegan, Henderson, Farabow, Garrett & Dunner, L.L.P.

(57) ABSTRACT

An aeration-less water treatment system includes an anaerobic treatment tank which subjects sewage supplied by a pump to anaerobic treatment by causing the sewage to upflow, and an aerobic treatment tank which subjects anaerobically treated water to aerobic treatment by letting the anaerobically treated water to downflow by natural downflow. The aerobic treatment tank includes an aerobic filter bed section in which carriers to which aerobic microorganisms are adhered are arranged. The aerobic filter bed section subjects the anaerobically treated water to decomposition treatment by putting the anaerobic treatment water in contact with the aerobic microorganisms adhered to surfaces of the carriers. The aerobic filter bed section is provided with an air port which takes in air into under normal pressure, thereby activating the aerobic microorganisms.

12 Claims, 9 Drawing Sheets

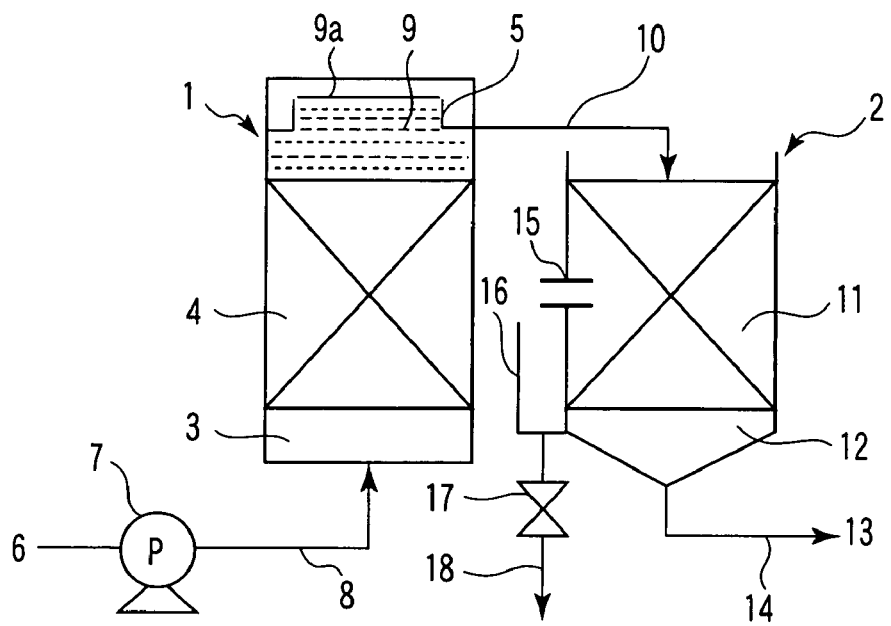
F I G. 2

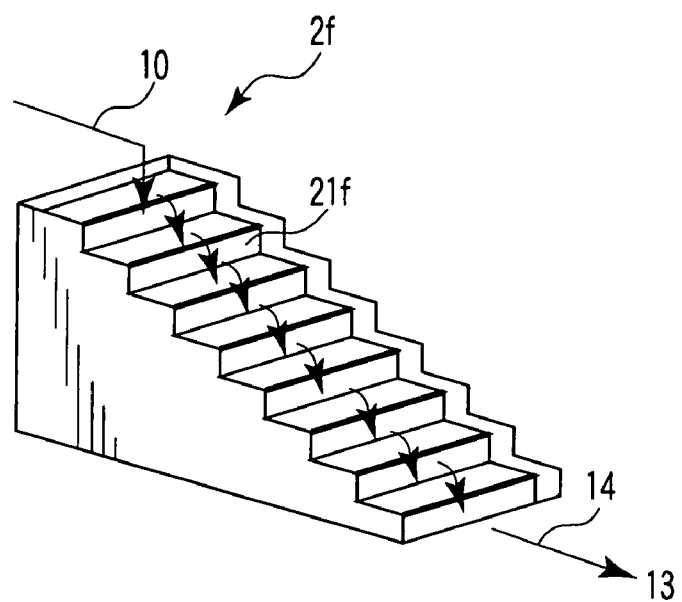
F I G. 13
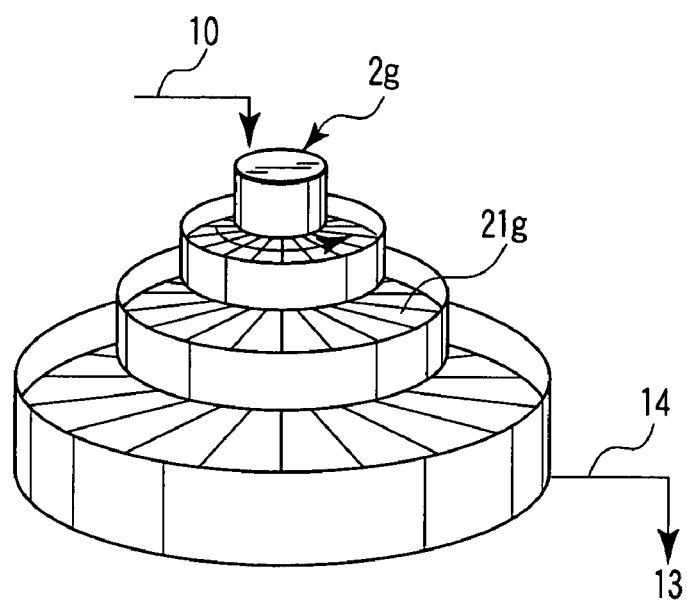
F I G. 14

WATER TREATMENT SYSTEM

CROSS-REFERENCE TO RELATED APPLICATIONS

This application is based upon and claims the benefit of priority from prior Japanese Patent Application No. 2006-142077, filed May 22, 2006, the entire contents of which are incorporated herein by reference.

BACKGROUND OF THE INVENTION

1. Field of the Invention

The present invention relates to an aeration-less water treatment system which performs an aerobic treatment by taking in air by making use of natural downflow of sewage.

2. Description of the Related Art

Conventionally, a water treatment system which cleans sewage has been proposed.

This water treatment system, as shown in FIG. 1, comprises an anaerobic treatment tank 101 and an aerobic treatment tank 102. In the anaerobic treatment tank 101, an anaerobic lower cavity section 103, an anaerobic filter bed section 104 and an anaerobic upper overflow section 105 are arranged in the named order from the lower side to the upper side. With driving of a pump 107, sewage 106 flows through a water pipe 108 and is supplied to the anaerobic lower cavity section 103. Then, the sewage 106 flows, as an upward stream, into the anaerobic filter bed section 104.

A great number of plastic carriers are disposed within the anaerobic filter bed section 104. Anaerobic microorganisms are adhered to the surface of each plastic carrier. Organic matter in the sewage, which has entered the anaerobic filter bed section 104, comes in contact with the anaerobic microorganisms. As a result, a predetermined amount of the organic matter is decomposed and removed by the decomposing function of the anaerobic microorganisms.

When the water, from which the predetermined amount of organic matter has been decomposed and removed by the decomposing function of the anaerobic microorganisms, is filled up to the anaerobic upper overflow section 105, the water is output as anaerobic treatment tank outlet water 109, and is supplied to the upper part of the aerobic treatment tank 102 through a water pipe 110. Reference numeral 109a denotes the water surface of the anaerobic treatment tank outlet water 109.

In the aerobic treatment tank 102, an aerobic filter bed section 111 and an aerobic lower cavity section 112 are arranged in the named order from the upper side to the lower side. A diffusion pipe 113 is disposed in the aerobic lower cavity section 112. With driving of a blower 114, air is taken in through air pipes 115 and bubbles are fed into the aerobic lower cavity section 112 from the diffusion pipe 113. Thereby, aeration treatment is performed.

The water, which has been supplied from the anaerobic treatment tank 101 into the aerobic treatment tank 102, is delivered to the aerobic filter bed section 111 as a downward stream. A great number of plastic carriers are disposed in the aerobic filter bed section 111, as in the anaerobic filter bed section 104. Aerobic microorganisms are adhered to the surface of each plastic carrier. At this time, the organic matter remaining in the anaerobic treatment tank outlet water 109 flows, as a downward stream, in the aerobic filter bed section 111, and comes in contact with the aerobic microorganisms and with the air that is supplied from the diffusion pipe 113. As a result, the residual organic matter is decomposed and removed by the decomposing function of the activated aerobic microorganisms. Reference numeral 116 designates a water pipe for discharging treated water, which has been drained from the aerobic filter bed section 111, to, e.g. a subsequent disinfection process (see Jpn. Pat. Appln. KOKAI Publication No. 11-285696).

As regards the above-described water treatment system, however, the following problems have been pointed out.

(1) The running cost of the blower 114 is high.

The diffusion pipe 113 is disposed in the aerobic lower cavity section 112, and bubbles are fed into the aerobic lower cavity section 112 from the diffusion pipe 113 by driving the blower 114. Since the driving energy for the blower 114 is large and the blower 114 needs to be driven at all times, the running cost of the blower 114 is high. In other words, it is difficult to perform water treatment at low running cost without driving the blower 114. Normally, the ratio of the driving energy cost of the blower 114 to the total running cost of the sewage treatment is about 50% to 70%. There is a demand for a decrease in the running cost of the blower 114.

(2) The treatment performance of the aerobic treatment becomes unstable.

In the water treatment system, if the blower 114 is dispensed with or if the air amount of the blower 114 is reduced, the oxygen in the aerobic lower cavity section 112 becomes deficient. As a result, proliferation of aerobic microorganisms, which require oxygen for their survival, would be suppressed, the microorganisms would be killed, and the treatment performance of the aerobic treatment tank 102 would considerably deteriorate.

(3) The process of reducing nutrient salts, such as nitrogen and phosphorus, is difficult to carry out only with the aerobic treatment.

When nitrogen, phosphorus, etc. are to be treated, it is necessary to adopt a method using microorganic reactions based on a nitrification reaction by anaerobic treatment and a denitrification reaction by aerobic treatment, or a method using a photosynthesis reaction. In this case, a circulation process from aerobic treatment to anaerobic treatment is needed. In the above-described water treatment process, however, if the circulation process from aerobic treatment to anaerobic treatment is adopted, aerobic microorganisms would mix in the anaerobic treatment tank 101, leading to degradation in anaerobic treatment. Thus, the circulation process from aerobic treatment to anaerobic treatment cannot be adopted, and as a result the process of reducing nitrogen, phosphorus, etc. is difficult to perform.

In the case of adopting the method using the photosynthesis reaction, the upper part of the treatment tank may be opened. However, only the opened part is irradiated with light, and no photosynthesis reaction takes place in other parts excluding the opened part. As a result, it is difficult to treat nutrient salts such as nitrogen and phosphorus.

BRIEF SUMMARY OF THE INVENTION

The present invention has been made in consideration of the above-described problems, and the object of the invention is to provide a water treatment system which activates aerobic microorganisms by taking in air when water to be treated naturally flows down, without using a pressurizing air supply source such as a blower, thereby ensuring reduction in running cost and stabilization of treatment performance of the aerobic microorganisms.

According to a first aspect of the invention, there is provided a water treatment system comprising: an anaerobic treatment tank which subjects supplied sewage to anaerobic treatment by causing the sewage to upflow by a pump; and an aerobic treatment tank which subjects anaerobically treated water, which is supplied to an upper part of the aerobic treatment tank from the anaerobic treatment tank, to aerobic treatment by letting the anaerobically treated water to downflow by natural downflow, wherein the aerobic treatment tank includes an aerobic filter bed section in which carriers to which aerobic microorganisms are adhered are arranged, the aerobic filter bed section subjecting the anaerobically treated water to decomposition treatment by putting the anaerobic treatment water in contact with the aerobic microorganisms adhered to surfaces of the carriers, the aerobic filter bed section being provided with an air supply section which takes in air into under normal pressure, thereby activating the aerobic microorganisms.

According to a second aspect of the invention, there is provided a water treatment system comprising: an anaerobic treatment tank which subjects supplied sewage to anaerobic treatment by causing the sewage to upflow by a pump; and an aerobic treatment tank which subjects anaerobically treated water, which is supplied to an upper part of the aerobic treatment tank from the anaerobic treatment tank, to aerobic treatment by letting the anaerobically treated water to downflow by natural downflow, wherein the aerobic treatment tank includes a plurality of divisional aerobic treatment tanks which are arranged in a height direction, each of the divisional aerobic treatment tanks including: an aerobic filter bed section in which carriers to which aerobic microorganisms are adhered are arranged; and air supply means for causing treated water, which is let to flow down as a downward stream from an upper-stage said divisional aerobic treatment tank and to pass through the aerobic filter bed section, to flow to a lower-stage said divisional aerobic treatment tank.

According to a third aspect of the invention, there is provided a water treatment system comprising: an anaerobic treatment tank which subjects supplied sewage to anaerobic treatment by causing the sewage to upflow by a pump; and an aerobic treatment tank which subjects anaerobically treated water, which is supplied to an upper part of the aerobic treatment tank from the anaerobic treatment tank, to aerobic treatment by letting the anaerobically treated water to downflow by natural downflow, wherein the aerobic treatment tank includes a spiral aerobic filter bed section in which carriers to which aerobic microorganisms are adhered are arranged, oxygen in air being taken in the anaerobically treated water by causing the anaerobically treated water to flow in a spiral flow fashion in the spiral aerobic filter bed section.

According to a fourth aspect of the invention, there is provided a water treatment system comprising: an anaerobic treatment tank which subjects supplied sewage to anaerobic treatment by causing the sewage to upflow by a pump; and an aerobic treatment tank which subjects anaerobically treated water, which is supplied to an upper part of the aerobic treatment tank from the anaerobic treatment tank, to aerobic treatment by letting the anaerobically treated water to downflow by natural downflow, wherein the aerobic treatment tank includes a stepwise aerobic filter bed section in which carriers to which aerobic microorganisms are adhered are arranged, the anaerobically treated water flowing in the stepwise aerobic filter bed section.

The present invention can provide a water treatment system which is capable of activating aerobic microorganisms by taking in air when water to be treated naturally flows down, without using a pressurizing air supply source such as a blower, thereby ensuring reduction in running cost and stabilization of treatment performance of the aerobic microorganisms.

BRIEF DESCRIPTION OF THE SEVERAL VIEWS OF THE DRAWING

FIG. 2 shows the entire structure of a first embodiment of an aeration-less water treatment system according to the present invention;

FIG. 13 shows the structure of an aerobic treatment tank in a fifth embodiment of the aeration-less water treatment system according to the invention;

FIG. 14 shows the structure of another example of the aerobic treatment tank in the fifth embodiment of the aeration-less water treatment system according to the invention;

DETAILED DESCRIPTION OF THE INVENTION

Figure 1:
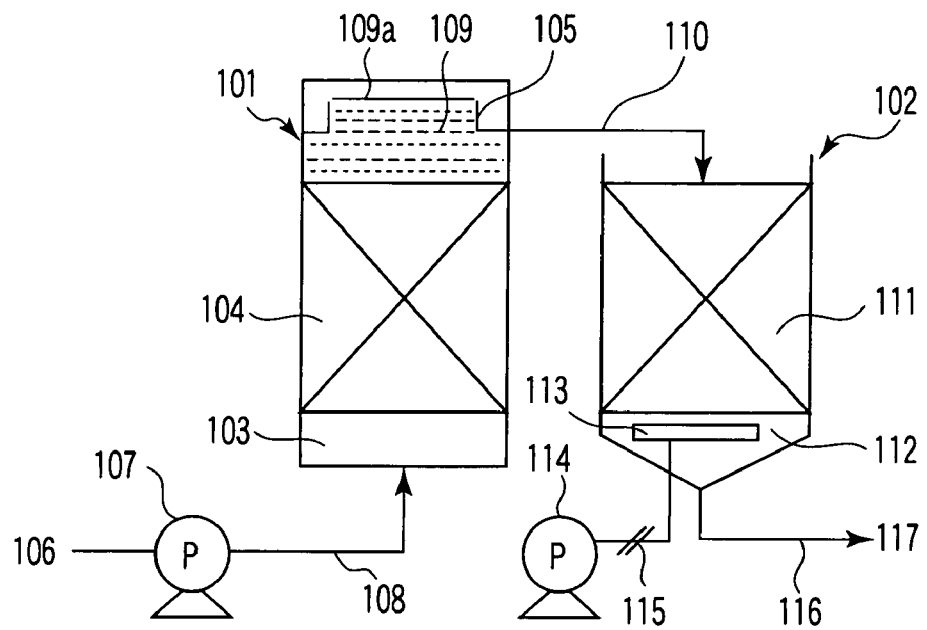
FIG. 1 shows the structure of a conventional water treatment system.

Embodiments of the present invention will now be described with reference to the accompanying drawings.

First Embodiment

FIG. 2 shows the entire structure of a first embodiment of an aeration-less water treatment system according to the present invention. The term "aeration-less" refers to a water treatment process of performing aerobic treatment by taking in air in the process of natural downflow of treated water of sewage, without driving a blower or the like to forcibly feed bubbles.

In FIG. 2, reference numeral 1 denotes an anaerobic treatment tank, and numeral 2 an aerobic treatment tank. In the anaerobic treatment tank 1, an anaerobic lower cavity section 3, an anaerobic filter bed section 4 and an anaerobic upper overflow section 5 are arranged in the named order from the lower side to the upper side. Sewage 6 flows through a pump 7 and a water pipe 8 and is supplied to the anaerobic lower cavity section 3 that is provided at the bottom part of the anaerobic treatment tank 1. Then, the sewage 6 flows, as an upward stream, into the anaerobic filter bed section 4. Reference numeral 9 indicates anaerobic treatment tank outlet water, and numeral 9a the water surface of the anaerobic treatment tank outlet water 9.

A great number of carriers of, e.g. plastic material (hereinafter generally referred to as "plastic carriers") are arranged within the anaerobic filter bed section 4. Anaerobic microorganisms are adhered to the surface of each plastic carrier.

The anaerobic upper overflow section 5, which is provided in the upper part of the anaerobic treatment tank 1, is coupled to the upper part of the aerobic treatment tank 2 via a water pipe 10. Water including organic pollutant matter, which has been anaerobically treated in the anaerobic treatment tank 1, is supplied to the aerobic treatment tank 2.

In the aerobic treatment tank 2, an aerobic filter bed section 11 and an aerobic lower cavity section 12 having an inverted-conical sloping structure are arranged in the named order from the upper side to the lower side. Treated water 13, which flows down to the bottom part of the aerobic lower cavity section 12, is delivered to a subsequent process (e.g. chlorination disinfection process) via a water pipe 14.

Further, a cylindrical air port member 15, which serves as an air supply section, is horizontally attached to a middle part of the wall surface of the aerobic filter bed section 11. Reference numeral 16 denotes a liquid shield section, and numeral 17 a valve. A slight amount of water, which leaks from the air port member 15, is stored in the liquid shield section 16 and discharged from the valve 17 to the outside via a water pipe 18. The valve 17, for example, may be configured so as to be automatically opened/closed when a predetermined value is measured by a water level indicator (not shown) that is disposed on the water shield section 16.

Figure 3:
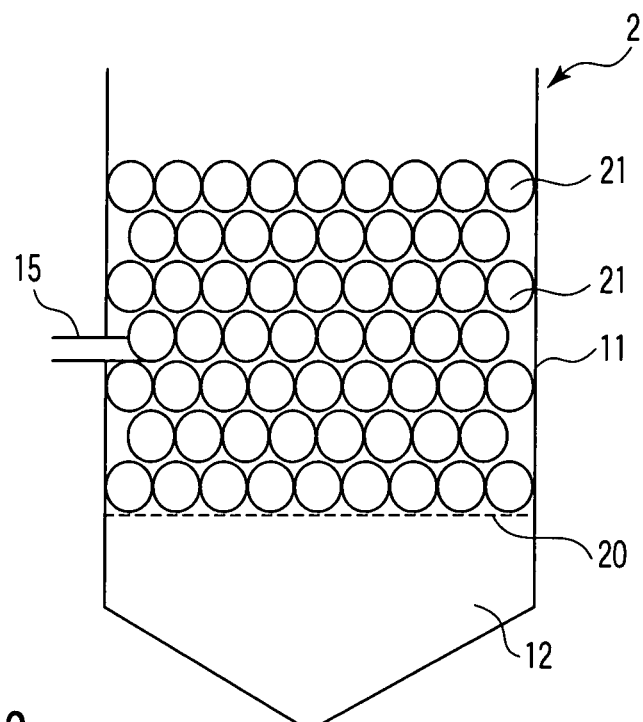
FIG. 3 shows an internal structure of an aerobic treatment tank shown in FIG. 2.

As shown in FIG. 3, in the aerobic filter bed section 11, a support member 20 having, for example, a mesh-like structure is disposed at a boundary part between the aerobic filter bed section 11 and the aerobic lower cavity section 12. A great number of plastic carriers 21 with various grain sizes are randomly disposed on the support member 20. Aerobic microorganisms are adhered to the surface of each plastic carrier 21. Innumerable small holes having sizes less than the grain sizes of plastic carriers 21 are formed in the support member 20. For example, if the grain size of the plastic carrier is 5 mm, the size of each hole in the support member 21 is about 1 mm.

Next, the operation of the above-described aeration-less water treatment system is explained.

By driving the pump 7, sewage 6 is supplied through the water pipe 8 into the anaerobic lower cavity section 3 of the anaerobic treatment tank 1. The sewage 6 is then supplied, as an upward stream, into the anaerobic filter bed section 4. In the anaerobic filter bed section 4, a great number of plastic carriers (not shown) are stacked with proper gaps therebetween. Anaerobic microorganisms, such as acid-producing bacteria, methane bacteria, denitrification bacteria and hydrogen bacteria, are adhered to the surfaces of the plastic carriers. As a result, the anaerobic microorganisms, which are adhered to the carriers, come in contact with organic pollutant matter included in the supplied sewage 6. By the anaerobic decomposing function of the anaerobic microorganisms, the organic pollutant matter is decomposed, removed and reduced.

In the meantime, as an example of the organic pollutant matter reducing process by chemical reactions, a description is given of a reaction between acid-producing bacteria (acid fermentation) and methane bacteria (methane fermentation).

Organic sludge matter is composed of high-polymer carbohydrate, fat, protein, etc., and is converted to the following matter by acid-producing bacteria and methane bacteria:

→fatty acid (R—COOH, $RCHNH_2COOH$ ... acid fermentation by acid-producing bacteria →acetic acid ($CH_3COOH$ ... acid fermentation by acid-producing bacteria →methane ($CH_4$)+carbon dioxide ($CO_2$) ... methane fermentation by methane bacteria    formula (1)

Specifically, according to the formula (1), the organic sludge matter in the sewage 6 is decomposed to fatty acid, acetic acid, methane and carbon dioxide by the decomposing reactions of the anaerobic microorganisms, such as acid-producing bacteria and methane bacteria, which are adhered to the carriers in the anaerobic filter bed section 4.

The water, in which the organic sludge matter has been reduced as described above, flows into the water pipe 10 as anaerobic treatment tank outlet water 9 from the anaerobic upper overflow section 5 that is provided in the upper part of the anaerobic treatment tank 1. The water is then supplied to the aerobic filter bed section 11 that is provided in the upper part of the aerobic treatment tank 2.

As shown in FIG. 3, the upper part of the aerobic filter bed section 11 is opened to take in air. In addition, an environment which enables photosynthesis reactions is created in the aerobic filter bed section 11. A great number of plastic carriers 21 are stacked on the support member 20 within the aerobic filter bed section 11, with proper gaps provided between the plastic carriers 21. Aerobic microorganisms are adhered to the surfaces of the carriers 21. The water, which has been supplied into the aerobic filter bed section 11, flows down as a downward stream. At this time, the water flows down while taking in outside air from the cylindrical air port member 15 under normal pressure. As a result, the anaerobic treatment tank outlet water 9, which is supplied from the anaerobic treatment tank 1, flows downward through gaps between the plastic carriers 21 in the state in which the anaerobic treatment tank outlet water 9 is mixed with the air taken in from the air port member 15.

In the process of downflow of the anaerobic treatment tank outlet water 9, the residual organic pollutant matter in the anaerobic treatment tank outlet water 9 comes in contact with the aerobic microorganisms in the presence of air, and an oxidation decomposition reaction according to the following formula takes place:

Organic sludge matter (CxHyOz)+oxygen (x+y/4−z/2) $O_2$

→carbon dioxide ($xCO_2$)+water ($y/2H_2O$))    formula (2)

where x, y and z are coefficients (x, y, z=an integer of 1, 2, ... ).

The water, which has been decomposed into carbon dioxide and $H_2O$ in the aerobic filter bed section 11, flows into the aerobic lower cavity section 12, flows through the water pipe 14 as treated water 13, and is sent to a subsequent process (e.g. chlorination disinfection process).

If part of the water in the aerobic filter bed section 11 flows out of the air port member 15, the water flowing out of the air port member 15 is stored in the liquid shield section 16 and is discharged from the water pipe 18 by opening the valve 17, for example, at regular time intervals.

It is possible that the water which is supplied to the aerobic filter bed section 11 contains hydrogen sulfide $H_2S$ that is an odorant component. In this case, the odorant component can be decomposed by the following decomposition reaction by taking in air from the upper part of the aerobic filter bed section 11 and from the air port member 15:

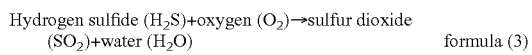

Hydrogen sulfide $(H_2S)$+oxygen $(O_2)$→sulfur dioxide $(SO_2)$+water $(H_2O)$               formula (3)

Therefore, according to the present embodiment, the following various advantageous effects can be obtained.

In this aeration-less water treatment system, the air port member 15 is attached to the middle part in the height direction of the aerobic filter bed section 11. For example, in a case where the height of the aerobic filter bed section 11 is relatively small, air can efficiently be taken into the aerobic filter bed section 11 with a small number of ports, thus greatly contributing to activation of aerobic microorganisms.

In addition, since the aerobic filter bed section 11 employs a fixed bed structure which is composed of plastic carriers 21, the aerobic microorganisms adhere to the plastic carriers 21 at high concentration, thus enhancing the performance of treating organic pollutant matter.

Moreover, since the anaerobic filter bed section 4 of the anaerobic treatment bed 1 also employs a fixed bed structure, and not a fluid bed structure, the anaerobic microorganisms, which would easily flow out in the case of low concentration, can be adhered to the surfaces of the carriers at high concentration, thus contributing to stabilization of the anaerobic decomposition reaction.

Figure 4:
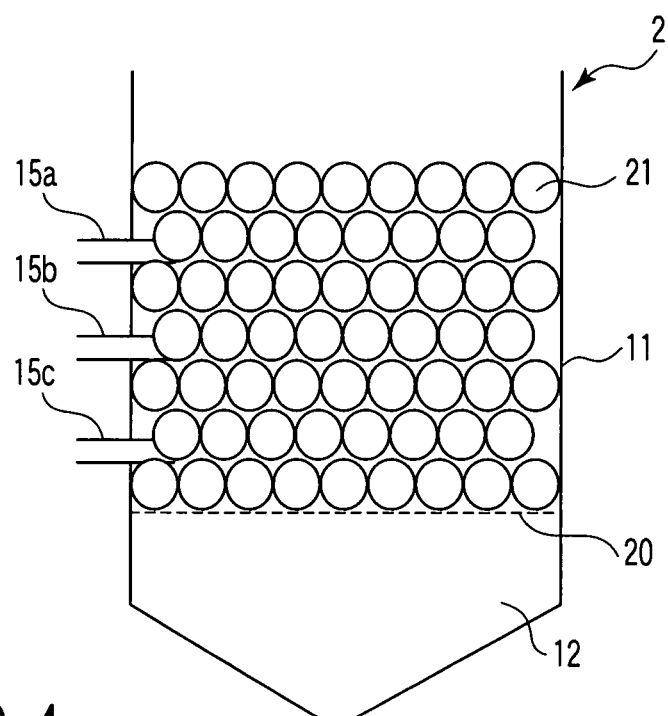
FIG. 4 shows the structure of another example of the aerobic treatment tank in the first embodiment of the aeration-less water treatment system according to the invention.

(Modifications of the First Embodiment)
(1) In the above-described embodiment, the cylindrical air port member 15 is horizontally attached to the wall surface of the aerobic filter bed section 11 at a middle position in the height direction of the wall surface. Alternatively, the cylindrical air port member 15 may be attached to the wall surface of the aerobic filter bed section 11, for example, in a downwardly inclined shape. With this structure, when the anaerobic treatment tank outlet water 9, which is supplied from the anaerobic treatment tank 1, flows down through the aerobic filter bed section 11, air can naturally be taken in from the air port member 15, and it becomes possible to prevent part of the water in the aerobic filter bed section 11 from flowing out.
(2) The number of air port members, which are attached to the wall surface of the aerobic filter bed section 11, may be increased in accordance with the height, size, etc. of the aerobic filter bed section 11. For example, a plurality of air port members 15a, 15b and 15c may be provided in a vertical direction, as shown in FIG. 4, or in a horizontal direction.

With the structure having the plural air port members 15a, 15b and 15c, air can uniformly be supplied to the entire plastic carriers 21 in the aerobic filter bed section 11, and proliferation and activation of the aerobic microorganisms can be facilitated.

Figure 5:
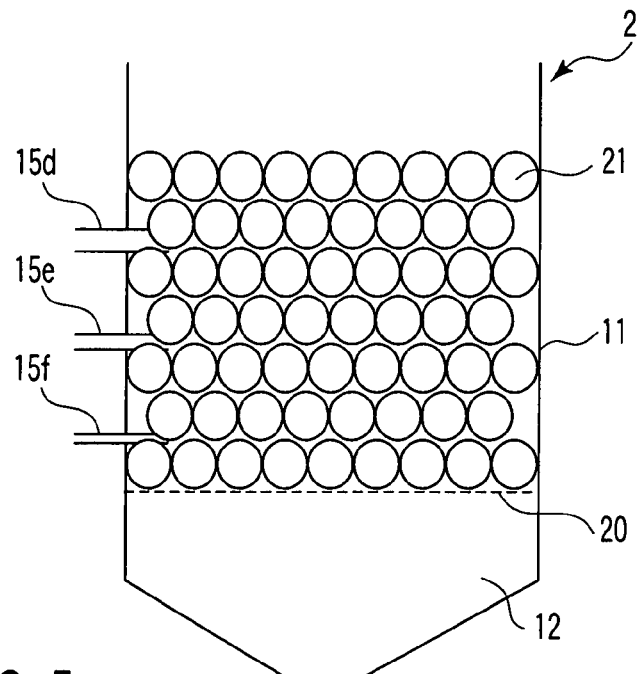
FIG. 5 shows the structure of still another example of the aerobic treatment tank in the first embodiment of the aeration-less water treatment system according to the invention.

In addition, as shown in FIG. 5, in the case where a plurality of air port members are provided in the vertical direction of the wall surface of the aerobic filter bed 11, the diameters of an upper air port member 15d, a middle air port member 15e and a lower air port member 15f may be gradually decreased.

With this structure, the air port member 15d with a large diameter is positioned at the upper part of the aerobic filter bed section 11, and a large amount of air is supplied from the air port member 15d to the water in the aerobic filter bed section 11. As the water is flowing down, the amount of air gradually decreases. However, air is replenished from the air port members 15e and 15f, and the flow amount of air in the vertical direction of the aerobic filter bed 11 is made uniform, thus greatly contributing to stabilization of the aerobic decomposition reaction.

In the structures shown in FIG. 4 and FIG. 5, too, downwardly inclined cylindrical air port members 15a, 15b, 15c, 15d, 15e, 15f may be attached to the wall surface.
(3) In the above-described embodiment, the plastic carriers are used in the anaerobic filter bed section 4 and aerobic filter bed section 11. Alternatively, carriers, other than plastic carriers, may be used.

Examples of the usable materials of the carriers include sand, anthracite, activated carbon, fibrous carriers, woody carriers, chaff, etc.

Since sand is small in grain size, the relative surface area is large and the amount of adhered aerobic microorganisms per volume can be increased. Since the surface of an anthracite carrier is rough, the amount of adhered aerobic microorganisms per carrier can be increased. Since the surface of an activated carbon carrier has adsorption properties, the amount of adhered aerobic microorganisms per carrier can be increased. Since the surface of a fibrous carrier has a large relative surface area, the amount of adhered aerobic microorganisms per volume can be increased. Since the surfaces of woody carriers and chaff carriers have adsorption properties, the amount of adhered aerobic microorganisms can be increased.

Thus, the above-described carriers, which are used in the anaerobic filter bed section 4 and aerobic filter bed section 11, may properly be selected in consideration of pollutant components, etc. in sewage 6. Not only one kind of carriers but also a proper combination of some kinds of carriers may be used. For example, in the case of the anaerobic filter bed section 4, if a sand layer, a chaff layer and an activated carbon layer are stacked vertically from below, the function of anaerobic decomposition of the sewage 6 can efficiently be promoted.
(4) As the anaerobic filter bed section 4, a fluid-bed-type reaction tank such as an upflow anaerobic sludge blanket (UASB) is usable. If this reaction tank is used, the carriers are always moving slightly. Hence, stains hardly adhere to the carrier surfaces, and clogging can be prevented.

Second Embodiment

Figure 6:
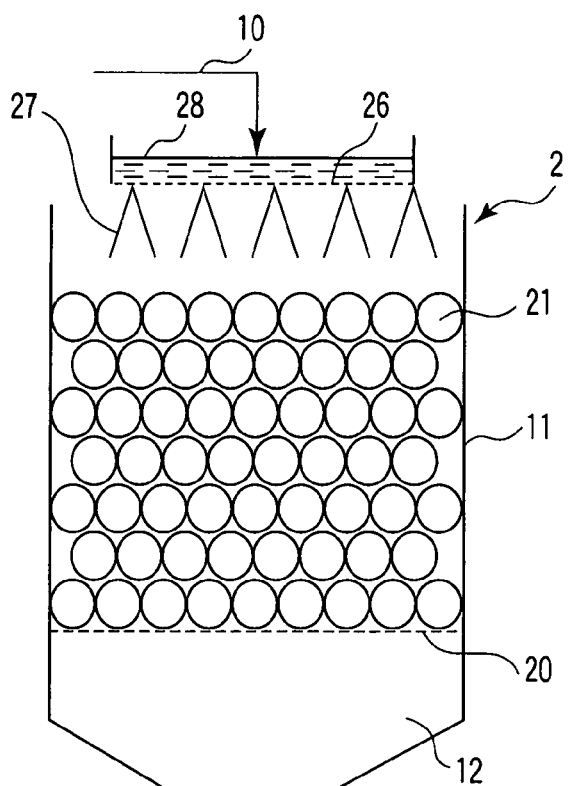
FIG. 6 shows an internal structure of an aerobic treatment tank in a second embodiment of the aeration-less water treatment system according to the invention.

FIG. 6 is a view for describing a second embodiment of the aeration-less water treatment system according to the present invention. In particular, FIG. 6 shows an improvement of the aerobic treatment tank. Since the structure of the second embodiment, excluding the aerobic treatment tank, is the same as that of the first embodiment, a description of common parts is omitted here.

In the aerobic treatment tank 2, a screen 26 serving as a diffusion section, an aerobic filter bed section 11 and an aerobic lower cavity section 12 are disposed in the named order form the upper side to the lower side.

The screen 26 is horizontally situated at the position of the uppermost part of the aerobic treatment tank 2. Specifically, the upper part of the screen 26 is completely opened, or closed with a mesh-like cover or a transparent cover which permits air intake. A great number of small holes are made in the lower surface part of the screen 26. The screen 26 receives the anaerobic treatment tank outlet water 9 from the anaerobic treatment tank 1 through the water pipe 10, and the received water is sprayed from the small holes and supplied to the aerobic filter bed section 11 in the form of spray water streams 27. Reference numeral 28 denotes a water surface in the screen 26.

The aerobic filter bed section 11 and aerobic lower cavity section 12 are the same as described with reference to FIG. 2.

The operation of the present embodiment is described.

The anaerobic treatment tank outlet water 9 is supplied through the water pipe 10 to the screen 26 that is disposed at the uppermost part of the aerobic treatment tank 2. Water streams 27 are sprayed from the many small holes in the lower surface of the screen 26 and flow to the upper part of the aerobic filter bed section 11. At this time, the water streams 27 flowing out of the small holes take in a great amount of air, and are supplied in the spray form to the upper part of the aerobic filter bed section 11.

As has been described above, many plastic carriers 21 are stacked in the aerobic filter bed section 11, and countless aerobic microorganisms are adhered to the surfaces of the carriers 21. As a result, the aerobic microorganisms adhered to the carriers 21 make use of oxygen dissolved in the water streams 27, and decompose and remove the organic pollutant matter according to the above-described organic decomposition reaction represented by formula (2). The water, from which the organic pollutant matter has been decomposed and removed, flow down to the aerobic lower cavity section 12 and is sent to, e.g. a disinfection process through the water pipe 14.

According to the present embodiment, when the water is supplied to the upper part of the screen 26 and is sprayed from the screen 26 as water streams 27, the sprayed water screams 27 contain a sufficient amount of oxygen in the air. Thus, without providing complex equipment, oxygen in the air can easily and efficiently be taken in and supplied to the aerobic microorganisms. Therefore, the above-described treatment performance according to formula (2) can be enhanced.

(Modifications of the Second Embodiment)

Figure 7:
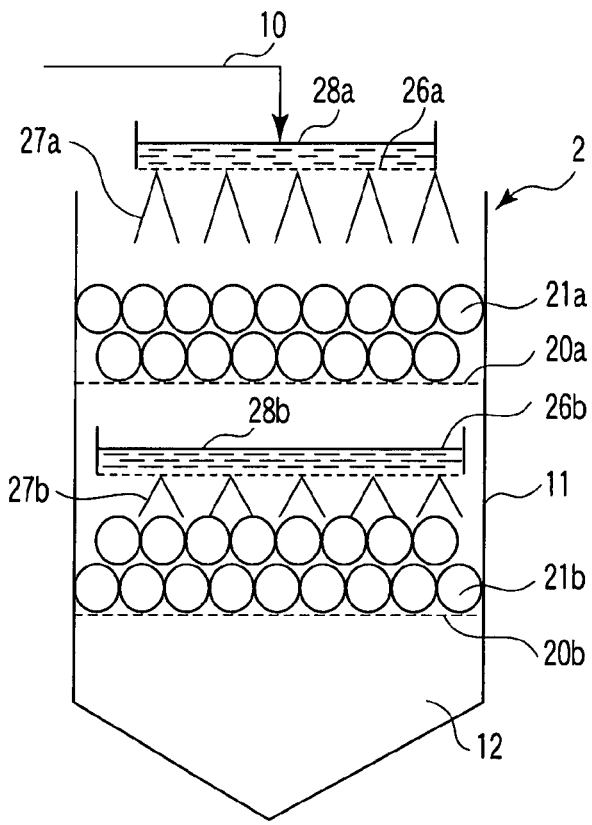
FIG. 7 shows an internal structure of another example of the aerobic treatment tank in the second embodiment of the aeration-less water treatment system according to the invention.

(1) In the above-described embodiment, the screen 26 is provided only at the uppermost part of the aerobic treatment tank 2. Alternatively, as shown in FIG. 7, a plurality of stages of aerobic filter bed sections 11 may be provided in the aerobic treatment tank 2, a great number of plastic carriers 21a, 21b may be disposed on the support member 20a, 20b in each aerobic filter bed section 11, and screens 26a, 26b may be provided on the plastic carriers 21a, 21b.

Specifically, the inside of the aerobic filter bed section 11 is divided, for example, into an upper-stage region and a lower-stage region. In the upper-stage region, a great number of plastic carriers 21a are stacked on an upper-stage support member 20a, and a screen 26a is horizontally situated above the stack of plastic carriers 21a. The anaerobic treatment tank outlet water 9 is supplied from the anaerobic treatment tank 1 to the screen 26a via the water pipe 10.

Similarly, in the lower-stage region, a lower-stage support member 20b is horizontally disposed at a boundary position between the lower-stage region and the aerobic lower cavity section 12, a great number of plastic carriers 21b are stacked on the lower-stage support member 20b, and a screen 26b is horizontally situated above the stack of the plastic carriers 21b.

With this structure, the anaerobic treatment tank outlet water 9, which is supplied from the anaerobic treatment tank 1, is sprayed from the screen 26a and flows in the spray form to the upper-stage aerobic filter bed section, while taking in oxygen in the air. While the decomposition function is being performed by aerobic microorganisms, the water falls on the lower-stage screen 26b. Oxygen in the air is taken in while the water flows to the lower-stage aerobic filter bed section from the screen 26b, as in the case of the screen 26a, and the aerobic microorganisms can be activated.

Figure 8:
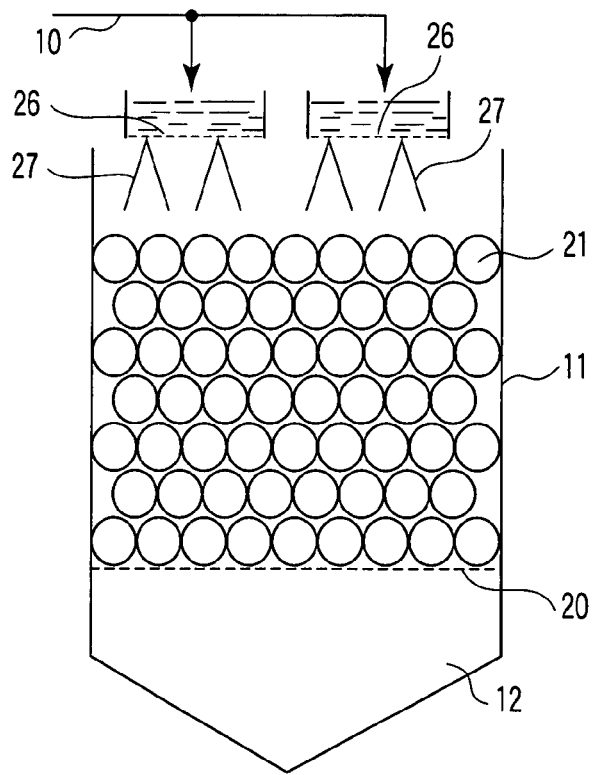
FIG. 8 shows the structure of still another example of the aerobic treatment tank in the second embodiment of the aeration-less water treatment system according to the invention.

(2) In FIG. 7, the aerobic filter bed section 11 is divided into the two regions, i.e. the upper-stage region and lower-stage region, in the vertical direction, and the screens 26a and 26b are disposed in the respective upper-stage and lower-stage regions. Alternatively, as shown in FIG. 8, for example, in a case where an aerobic treatment tank 2 with a large horizontal width is used, a plurality of screens 26 may be horizontally disposed at the uppermost part of the aerobic treatment tank 2.

As described above, even in the case where the aerobic treatment tank 2 has a large horizontal width, a plurality of divided screens 26 may be provided and the anaerobic treatment tank outlet water 9, which is supplied from the anaerobic treatment tank 1, may be supplied to the respective screens 26 in a distributed fashion. Thereby, the oxygen dissolution efficiency by the spraying is enhanced, and the water, which uniformly takes in oxygen in the air, can be supplied to the entirety of the aerobic filter bed section 11. Moreover, a contribution is made to uniform activation of aerobic microorganisms.

Third Embodiment

Figure 9:
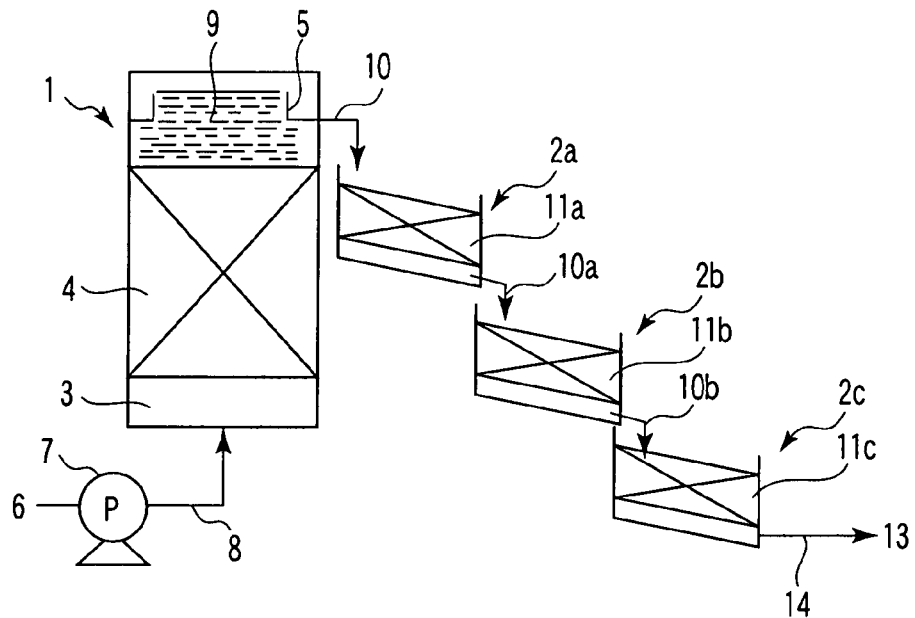
FIG. 9 shows the structure of an aerobic treatment tank in a third embodiment of the aeration-less water treatment system according to the invention.

FIG. 9 is a view for describing a third embodiment of the aeration-less water treatment system according to the invention. In particular, FIG. 9 shows an improvement of the aerobic treatment tank. Since the structure of the third embodiment, excluding the aerobic treatment tank 2, is the same as that of the first embodiment, a description of common parts is omitted here.

The aerobic treatment tank comprises a plurality of divisional aerobic treatment tanks 2a, 2b and 2c. The upper-stage divisional aerobic treatment tank 2a is disposed at a height position corresponding to the upper part, which receives the anaerobic treatment tank outlet water 9 that is supplied from the anaerobic treatment tank 1. The middle-stage divisional aerobic treatment tank 2b is disposed at a height position which is lower than the upper-stage divisional aerobic treatment tank 2a and is displaced from the upper-stage divisional aerobic treatment tank 2a in the lateral direction. The lower-stage divisional aerobic treatment tank 2c is disposed at a height position which is lower than the middle-stage divisional aerobic treatment tank 2b and is displaced from the middle-stage divisional aerobic treatment tank 2b in the lateral direction. The divisional aerobic treatment tanks 2a, 2b and 2c are connected via water pipes 10a and 10b. Reference numerals 11a, 11b and 11c denote aerobic filter bed sections in the divisional aerobic treatment tanks 2a, 2b and 2c.

This aeration-less water treatment system is configured such that the anaerobic treatment tank outlet water 9, which is supplied from the anaerobic treatment tank 1, flows, while undergoing the aerobic decomposition reaction in the divisional aerobic treatment tank 2a, into the middle-stage divisional aerobic treatment tank 2b and then into the lower-stage divisional aerobic treatment tank 2c in the form of turbulent streams via the water pipes 10a and 10b.

Each of the divisional aerobic treatment tanks 2a, 2b and 2c individually includes an aerobic filter bed section 11a, 11b, 11c and an aerobic lower cavity section 12a, 12b, 12c from the upper side to the lower side. A great number of plastic carriers 21 are disposed in each of the aerobic filter bed section 11a, 11b and 11c.

In FIG. 9, the divisional aerobic treatment tanks 2a, 2b and 2c are disposed in inclined positions. Alternatively, the divisional aerobic treatment tanks 2a, 2b and 2c may be horizontally disposed.

According to the present embodiment, the upper parts of the divisional aerobic treatment tanks 2a, 2b and 2c are completely opened. Thus, the photosynthesis reaction can advantageously be facilitated, and algae can effectively be grown. As a result, the above-described decomposition reaction according to formula (3) is carried out by the growth of algae, the odorant components contained in the anaerobic treatment tank outlet water 9 are advantageously decomposed into odor-free components.

As regards the respective divisional aerobic treatment tanks 2a, 2b and 2c, the anaerobic treatment tank outlet water 9 flows vertically downward within the divisional aerobic treatment tanks 2a, 2b and 2c, and flows in an oblique direction through the divisional aerobic treatment tanks 2a, 2b and 2c in the form of turbulent streams like waterfalls. Hence, the dissolution efficiency of oxygen in the air can be enhanced. As a result, the decomposition reaction of the organic pollutant matter by aerobic microorganisms with use of oxygen in the aerobic filter bed sections 11a, 11b and 11c is promoted, the decomposition of organic pollutant matter in the water is facilitated, and the water treatment performance is improved. Therefore, clean treated water 13 can be produced by the improvement in the decomposition efficiency of organic pollutant matter.

(Modification of the Third Embodiment)

Figure 10:
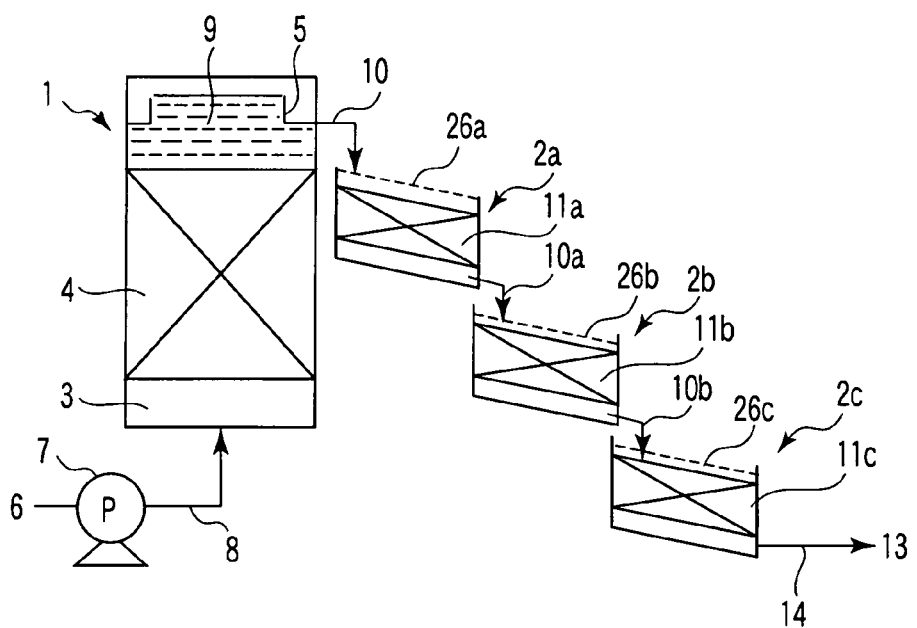
FIG. 10 shows the structure of another example of the aerobic treatment tank in the third embodiment of the aeration-less water treatment system according to the invention.

In the third embodiment, the divisional aerobic treatment tanks 2a, 2b and 2c are arranged in a stepwise sloping fashion with positional displacements in the lateral direction. Additionally, as shown in FIG. 10, screens 26a, 26b and 26c may be provided at the uppermost parts of the divisional aerobic treatment tanks 2a, 2b and 2c. Thereby, the same advantageous effect as described with reference to FIG. 6 can be obtained.

The divisional aerobic treatment tanks 2a, 2b and 2c are arranged with a space area to each other. Therefore, it will be possible to improve the oxygen dissolution efficiency etc., since the anaerobic treatment tank outlet water 9 contacts with air in the space area.

Fourth Embodiment

Figure 11:
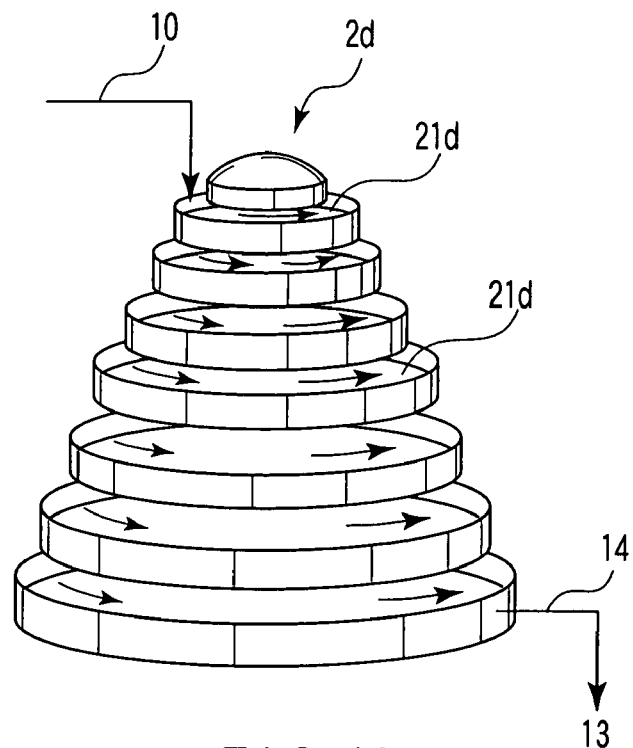
FIG. 11 shows the structure of an aerobic treatment tank in a fourth embodiment of the aeration-less water treatment system according to the invention.

FIG. 11 is a view for describing a fourth embodiment of the aeration-less water treatment system according to the invention. In particular, FIG. 11 shows an improvement of the aerobic treatment tank. Since the structure of the fourth embodiment, excluding the aerobic treatment tank, is the same as that of the first embodiment, a description of common parts is omitted here.

The aerobic treatment tank, which is used in the fourth embodiment, is a spiral aerobic treatment tank 2d having a so-called spiral (conical) shape, with a dimension gradually increasing radially outward from the upper central part toward the lower side.

The upper central part of the spiral aerobic treatment tank 2d is connected via the water pipe 10 to the anaerobic upper overflow section 5 that is provided in the upper part of the anaerobic treatment tank 1. A great number of plastic carriers 21d are arranged in the spiral aerobic treatment tank 2d, and the upper part of the spiral aerobic treatment tank 2d is completely opened.

A water pipe 14 is connected to the lowermost part of the spiral aerobic treatment tank 2d, and treated water 13 is sent to a subsequent process such as a disinfection process.

The operation of this aeration-less water treatment system is described.

The anaerobic treatment tank outlet water 9 is supplied from the anaerobic treatment tank 1 to the upper part of the spiral aerobic treatment tank 2d via the water pipe 10. The supplied water including organic pollutant matter comes in contact with aerobic microorganisms adhered to the surfaces of the plastic carriers 21d, while flowing down in the spiral aerobic treatment tank 2d. At the same time, while flowing down as a turbulent stream, the water takes in oxygen in the air. Thereby, the aerobic decomposition reactions of organic pollutant matter take place according to the above-described formulae (2) and (3). As a result, the organic pollutant matter in the water are decomposed and removed while the water is flowing down, and the water becomes clean treated water 13 and is discharged from the water pipe 14.

According to the present embodiment, the plastic carriers 21d are arranged from the upper part to the lower peripheral part of the spiral aerobic treatment tank 2d. The water including organic pollutant matter takes in oxygen in the air and flows down, while coming in contact with the surfaces of the plastic carriers 21d. As a result, the number of opportunities of contact with air increases and the oxygen dissolution efficiency is enhanced. Therefore, the activation of aerobic microorganisms is promoted, and the stable aerobic decomposition function is maintained, thus contributing to stabilization of the treatment performance.

(Modifications of the Fourth Embodiment)

Figure 12:
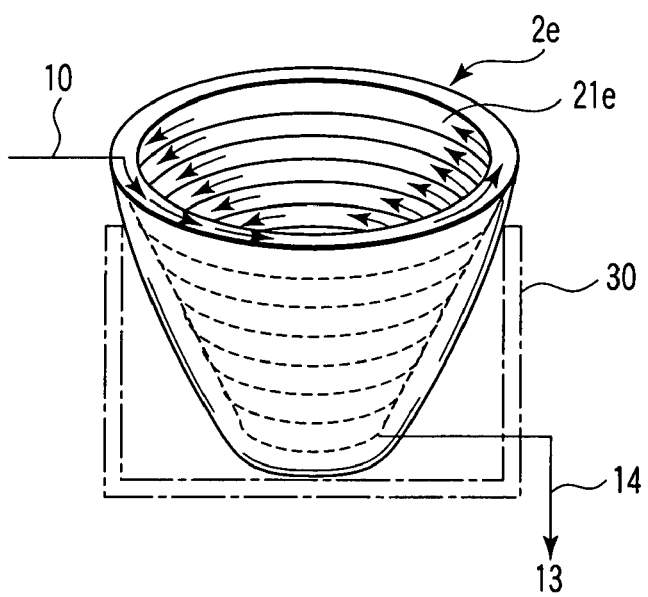
FIG. 12 shows the structure of another example of the aerobic treatment tank in the fourth embodiment of the aeration-less water treatment system according to the invention.

In the fourth embodiment, the spiral aerobic treatment tank 2d is formed in a substantially conical shape. Alternatively, as shown in FIG. 12, a spiral aerobic treatment tank 2e with a substantially inverted-conical shape may be formed. The spiral aerobic treatment tank 2e is so formed as to have a spiral shape with a large-diameter arc at the upper part and arcs with diameters gradually decreasing toward the lower part. The upper part of the spiral aerobic treatment tank 2e is completely opened. A great number of plastic carriers 21e are arranged in the spiral aerobic treatment tank 2e, like the spiral aerobic treatment tank shown in FIG. 11. Aerobic microorganisms are adhered to the surfaces of the carriers 21. The spiral aerobic treatment tank 2e is situated in a large-sized container 30 in order to keep a stable upright position thereof.

According to this structure, treated clean water 13 can be collected in the bottom central part of the aerobic treatment tank 2e, and can be recovered via the water pipe 14.

In FIG. 11 and FIG. 12, both the aerobic treatment tanks 2d and 2e have conical shapes. Alternatively, the aerobic treatment tank may have, e.g. a pyramid shape or an inverted-pyramid shape. With this structure, a change occurs in the fluid state at the rectangular corner portions, thus enhancing the oxygen dissolution efficiency.

Fifth Embodiment

FIG. 13 is a view for describing a fifth embodiment of the aeration-less water treatment system according to the invention. In particular, FIG. 13 shows an improvement of the aerobic treatment tank. Since the structure of the fifth embodiment, excluding the aerobic treatment tank, is the same as that of the first embodiment, a description of common parts is omitted here.

In the present embodiment, a stepwise aerobic treatment tank 2f is used. A great number of plastic carriers 21f are arranged in the stepwise inside part of the stepwise aerobic treatment tank 2f.

The anaerobic treatment tank outlet water 9 is supplied from the anaerobic treatment tank 1 to the uppermost stage of the stepwise aerobic treatment tank 2f via the water pipe 10. The supplied water, while coming in contact with the surfaces of the plastic carriers 21f in the respective stages, flows down in the form of turbulent streams successively to the lower stages. The treated water is sent from the lowermost stage to a subsequent process via the water pipe 14.

According to this structure, the anaerobic treatment tank outlet water 9, which is supplied from the anaerobic treatment tank 1, flows down through the stepwise part in the state in which a change occurs in the fluid state, that is, in the state in which turbulence occurs in the flowing water. Thus, the anaerobic treatment tank outlet water 9 can easily take in oxygen in the air, and the oxygen dissolution efficiency can be enhanced. Therefore, as described above, the microorganisms adhering to the surfaces of the plastic carriers 21f are activated, and the organic pollutant matter included in the anaerobic treatment tank outlet water 9 can be efficiently and stably decomposed and removed by the decomposition reaction according to the above-described formulae (2) and (3).

Alternatively, as shown in FIG. 14, a multi-stage aerobic treatment tank 2g with vertically arranged stages may be formed by stacking a plurality of treatment tanks with different diameters. Water flowing over an upper-stage treatment tank falls in a lower-stage treatment tank. A great number of plastic carriers 21g are arranged in the treatment tanks of the respective stages, and aerobic microorganisms are adhered to the surfaces of the plastic carriers 21g in the same fashion as described above.

With this structure, the same advantageous effect as with the structure shown in FIG. 13 can be obtained.

Sixth Embodiment

Figure 15:
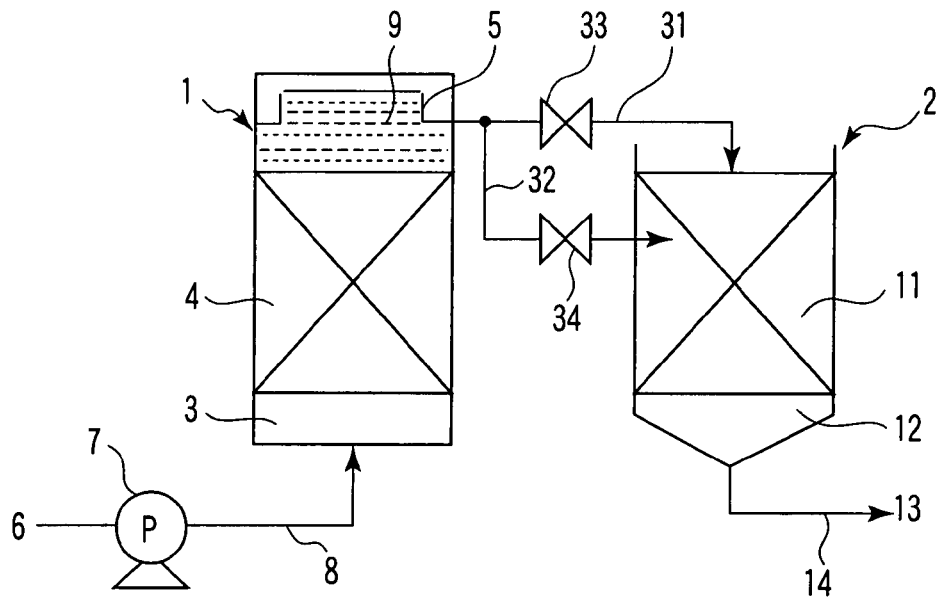
FIG. 15 shows the entire structure of a sixth embodiment of the aeration-less water treatment system according to the invention.

FIG. 15 is a view for describing a sixth embodiment of the aeration-less water treatment system according to the invention. FIG. 15 shows an improvement of the aerobic treatment tank, like the above-described embodiments. Since the structure of the sixth embodiment, excluding the aerobic treatment tank, is the same as that of the first embodiment, a description of common parts is omitted here.

In this embodiment, a plurality of branch pipes 31 and 32 extend from the anaerobic upper overflow section 5 of the anaerobic treatment tank 1. The branch pipe 31 is connected to the upper part of the aerobic filter bed section 11 of the aerobic treatment tank 2, and the other branch pipe 32 is connected to a middle part of the aerobic filter bed section 11. The branch pipes 31 and 32 are individually equipped with valves 33 and 34.

The operation of the aerobic treatment tank 2 in the aeration-less water treatment system is described.

In the aerobic treatment tank 2, the valves 33 and 34 are alternately opened/closed at predetermined time intervals. When the valve 33 is opened, the anaerobic treatment tank outlet water 9 in the anaerobic treatment tank 1 is supplied to the upper part of the aerobic filter bed section 11 of the aerobic treatment tank 2 via the branch pipe 31, and the water level of the supplied water 9 corresponds to a position of the upper part of the aerobic filter bed section 11.

On the other hand, when the valve 34 is opened, the anaerobic treatment tank outlet water 9 in the anaerobic treatment tank 1 is supplied to the middle part of the aerobic filter bed section 11 of the aerobic treatment tank 2 via the branch pipe 32, and the water level of the supplied water 9 changes to a position of the middle part of the aerobic filter bed section 11.

With the above-described structure, the valves 33 and 34 are alternately switched and the water level in the aerobic filter bed section 11 is varied. Thus, the upper region near the water level is set in a gas phase state, and the oxygen dissolution efficiency for microorganisms near the water level can be enhanced. In addition, the number of opportunities of contact with air can be increased in the entire growth region of aerobic microorganisms in the aerobic filter bed section 11. Therefore, a large contribution is made to activation of aerobic microorganisms, and the treatment performance can be stabilized.

In FIG. 15, two branch pipes 31 and 32 are provided. However, the number of branch pipes is not limited to two. Specifically, three or more branch pipes may be provided and connected to the aerobic filter bed section 11 at different positions in the height direction. The respective branch pipes are individually equipped with valves, and the valves are successively opened/closed in a predetermined order. Alternatively, the branch pipes may be connected to the aerobic filter bed section 11 at different positions not in the height direction but in the horizontal direction.

In addition, the valves 33 and 34 may be manually opened/closed. Alternatively, by combining electrically driven valves and a timer, the valves 34 and 34 may alternately be opened/closed automatically at predetermined time intervals.

Seventh Embodiment

Figure 16:
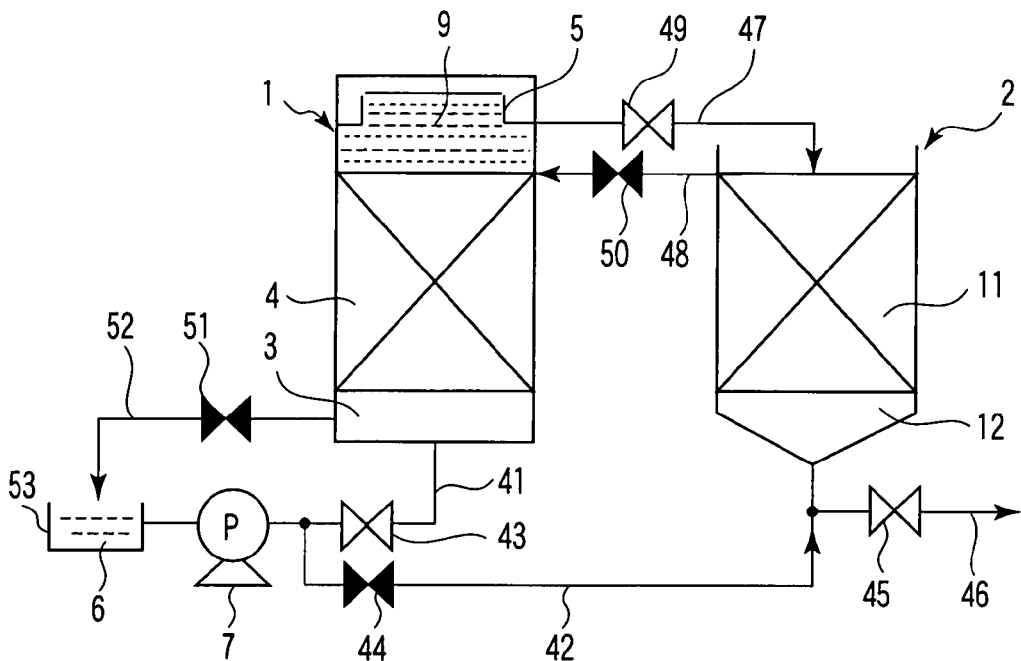
FIG. 16 shows the entire structure of a seventh embodiment of the aeration-less water treatment system according to the invention.

FIG. 16 is a view showing the structure of a seventh embodiment of the aeration-less water treatment system according to the invention.

In this embodiment of the aeration-less water treatment system, a backwashing operation can be performed in the treatment tanks 1 and 2. Specifically, in the aeration-less water treatment system, an output side of the pump 7 is connected to the bottom part of the anaerobic treatment tank 1 and the bottom part of the aerobic treatment tank 2 via water pipes 41 and 42. The water pipes 41 and 42 are equipped with valves 43 and 44. A water pipe 46, which is equipped with a valve 45, extends from a predetermined part of the water pipe 42 which is provided between the valve 44 and the bottom part of the aerobic treatment tank 2, and the water pipe 46 is connected to a subsequent process.

In addition, water pipes 47 and 48 are connected, respectively, between the anaerobic upper overflow section 5 and the upper part of the aerobic filter bed section 11 of the aerobic treatment tank 2 and between the upper part of the aerobic filter bed section 11 and the upper part of the anaerobic filter bed section 4 of the anaerobic treatment tank 1. The water pipes 47 and 48 are equipped with valves 49 and 50. Furthermore, a water pipe 52, which is equipped with a valve 51, is connected at one end to the anaerobic lower cavity section 3 that is disposed at the lower part of the anaerobic treatment tank 1. The other end portion of the water pipe 52 is connected to a reservoir 53 in which sewage 6 is stored. In the other structural aspects, the structure of the seventh embodiment is the same as that shown in FIG. 1, so a description of common parts is omitted here.

Figure 17:
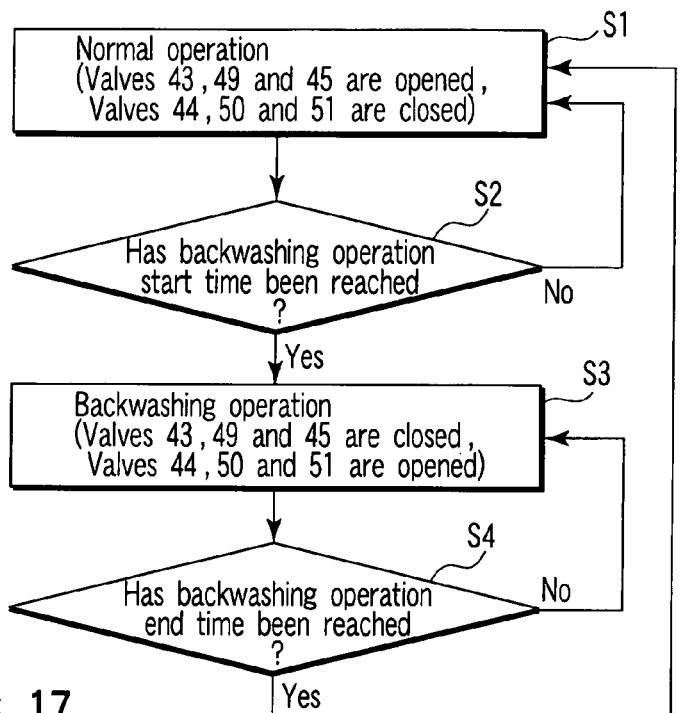
FIG. 17 is a flow chart illustrating the operation of the aeration-less water treatment system shown in FIG. 16.

Next, the operation of this aeration-less water treatment system is described with reference to FIG. 17.

At a time of a normal operation, that is, at a time of decomposition treatment of sewage 6, the valves 43, 49 and 45 are opened, and the other valves 44, 50 and 51 are closed (S1).

In this state, it is determined whether a backwashing operation start time has been reached (S2). If the backwashing operation start time has not yet been reached, the pump 7 is driven, and the sewage 6 is supplied to the anaerobic lower cavity section 3 via the water pipe 41. The sewage 6 is let to upflow within the anaerobic treatment tank 1. The water containing organic pollutant matter, which has reached the anaerobic upper overflow section 5 that is provided at the upper part of the anaerobic treatment tank 1, is supplied to the upper part of the aerobic treatment tank 2 via the water pipe 47 that is equipped with the valve 49. The water is then let to downflow into the aerobic treatment tank 2.

In the treatment tanks 1 and 2, the reaction of the above-described formula (1) by the anaerobic microorganisms and the reaction of formula (2) by the aerobic microorganisms are performed to decompose and remove the organic pollutant matter in the sewage 6. Thus, the sewage 6 is decomposed to clean treated water 46, and the clean treated water 46 is sent to a subsequent process, such as a disinfection process, through the water pipe 42 and the water pipe 46 that is equipped with the valve 45.

On the other hand, in step S2, if it is determined that the backwashing operation start time has been reached, the normal operation is switched to the backwashing operation. In the backwashing operation, the valves 43, 49 and 45 are closed, and the valves 44, 50 and 51 are opened (S3). Thus, the direction of water flow is reversed. Specifically, sewage 6 flows through the water pipe 42 that is equipped with the valve 44, and is supplied to the bottom part in the aerobic treatment tank 2. In the aerobic treatment tank 2, the sewage 6 flows as an upward stream. After the sewage 6 reaches the upper part of the aerobic treatment tank 2, the sewage 6 flows through the water pipe 48 that is equipped with the valve 50, and is supplied to the upper part of the anaerobic treatment tank 1. In the anaerobic treatment tank 1, the water that is received from the aerobic treatment tank 2 flows as a downward stream. The water then flows through the water pipe 52 that is equipped with the valve 51, and is returned to the reservoir 53 of sewage 6.

At the time of the reverse-flow backwashing operation, it is determined whether a backwashing operation end time has been reached (S4). If the backwashing operation end time has not yet been reached, the backwashing operation is continued. In step S4, if the backwashing operation end time has been reached, the respective valves 43, 44, 45, 49, 50 and 51 are opened/closed and restored to the states of the normal operation, and then the decomposition reaction process of sewage 6 is carried out.

As a result, at the time of the backwashing operation, an excess amount of high-concentration aerobic microorganisms, etc., which have proliferated in the aerobic filter bed section 11 in the aerobic treatment tank 2, is separated from the plastic carriers 21 by the shearing force of the reverse flow of the water. The matter separated by the cleaning rises within the aerobic treatment tank 2 along with the sewage 6 and is supplied to the upper part in the anaerobic treatment tank 1.

The water including the matter separated by the cleaning in the aerobic treatment tank 2, which is supplied into the anaerobic treatment tank 1, flows down in the anaerobic treatment tank 1 as a downward stream. At this time, an excess amount of high-concentration anaerobic microorganisms, etc., is similarly separated by the shearing force of the reverse flow of the water, and is returned to the reservoir 53 of sewage 6 via the water pipe 52 which is equipped with the valve 51.

Thus, according to the present embodiment, the flow path between the anaerobic treatment tank 1 and aerobic treatment tank 2 is switched to the flow path that is different from the flow path for the normal operation. Thereby, aside from the normal operation, the backwashing operation can easily be performed, and the performance of the organic decomposition reaction in the treatment tanks 1 and 2 can be recovered, and the stable decomposition treatment performance can be ensured.

The sewage 6, which is supplied by the driving of the pump 7, is returned to the sewage reservoir after the treatment tanks 1 and 2 have been cleaned. Therefore, a special tank for treating cleaning water is not needed, and the space-saving operation is realized.

Since the direction of water flow is reversed between the normal operation and the backwashing operation, the shearing force for shearing the matter to be cleaned is increased, the clearing effect is enhanced, and the recovery of the organic decomposition reaction performance is facilitated.

(Modifications of the Seventh Embodiment)

(1) If the anaerobic treatment tank 1 and aerobic treatment tank 2 are cleaned with use of individual reverse cleaning flow paths, the excess amount of proliferated anaerobic microorganisms and the excess amount of proliferated aerobic microorganisms can independently be recovered and stored. Thereby, when the conditions of microorganisms in the treatment tanks 1 and 2 have deteriorated, the stored microorganisms can be replenished and reproduced. In addition, if contamination (microorganic contamination) is carried out by moving the excess microorganisms in the treatment tanks 1 and 2 into the opposite treatment tanks 2 and 1, the problem that the activation of microorganisms in the symmetrical tanks deteriorates can be solved by performing the individual backwashing operations.

(2) It is possible to recover the cleaned sewages in other tanks, without performing the circulatory treatment of the sewage 6. Like the above case (1), the activation of microorganisms can be maintained.

(3) In the above-described embodiment, the backwashing operation is performed by reversing the flow direction in the normal operation. It is also possible to perform the backwashing operation by increasing the flow rate in the normal operation. For example, in the structure shown in FIG. 1, the driving force of the pump 7 is increased and the flow rate of the sewage 6 is increased. By increasing the fluidity in the treatment tanks 1 and 2, the microorganisms in the treatment tanks 1 and 2 can be separated. Needless to say, this technique is applicable not only to the structure shown in FIG. 1, but also to the case in which the flow rate is increased in the backwashing operation in the structure shown in FIG. 16.

Eighth Embodiment

Figure 18:
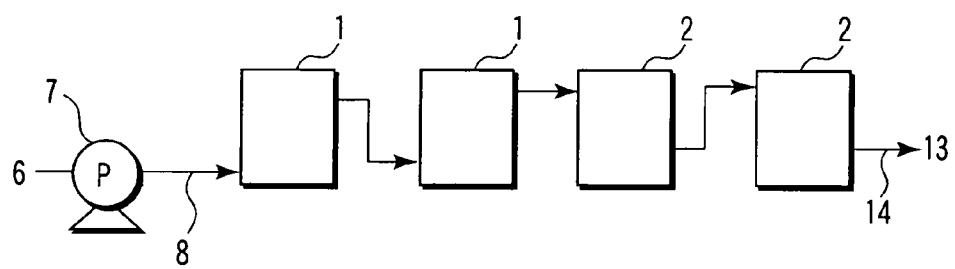
FIG. 18 shows an example of the entire structure of an eighth embodiment of the aeration-less water treatment system according to the invention.

FIG. 18 shows the structure of an eighth embodiment of the aeration-less water treatment system according to the invention.

In this aeration-less water treatment system, a plurality of anaerobic treatment tanks 1 are connected in series. Anaerobic treatment tank outlet water 9 in the upper part of the last anaerobic treatment tank 1 is supplied to the upper part of a first one of a plurality of aerobic treatment tanks 2 which are also connected in series. Each anaerobic treatment tank 1 and each aerobic treatment tank 2 have the same structures as described in the preceding embodiments.

The operation of the aeration-less water treatment system having the above structure is described.

Two anaerobic treatment tanks 1 are connected in series, and decomposition reactions are performed therein. For example, different species of anaerobic microorganisms are adhered to the surfaces of many plastic carriers in the anaerobic treatment tanks 1, and proper decomposition treatments are carried out. For instance, solubilizing microorganisms which solubilize persistent organic matter are used as dominant species in the former-stage anaerobic treatment tank 1, and methane bacteria which convert solubilized organic matter to methane, etc. are used as dominant species in the latter-stage anaerobic treatment tank 1, thereby converting the organic matter to methane by decomposition reaction treatment.

On the other hand, two aerobic treatment tanks 2 are connected in series. Heterotrophic bacteria for removing organic matter are dominantly adhered to the plastic carriers 21 in the former-stage aerobic treatment tank 2, and nitrification bacteria, etc. for nitrification and (ammonia) removal are dominantly adhered to the plastic carriers 21 in the latter-stage aerobic treatment tank 2, thus being able to carry out decomposition reaction treatment.

According to the above-described structure, the plural anaerobic treatment tanks 1 and plural aerobic treatment tanks 2 are connected in series, respectively. Thereby, the species of adhering microorganisms can be varied at the time of performing the anaerobic treatment and aerobic treatment. Not only organic pollutant matter but also persistent microorganisms and pollutant matter, such as ammonia nitrogen and phosphorus, can easily be subjected to decomposition reaction treatment.

(Modifications of the Eighth Embodiment)

(1) In the above-described embodiment, the two anaerobic treatment tanks 1 are arranged on the former-stage side and the two aerobic treatment tanks 2 are arranged on the latter-stage side. Alternatively, three or more anaerobic treatment tanks and aerobic treatment tanks may be arranged, respectively.

The number of anaerobic treatment tanks and the number of aerobic treatment tanks may not be equal. Different numbers of anaerobic treatment tanks and aerobic treatment tanks, for instance, two anaerobic treatment tanks and three aerobic treatment tanks, or three anaerobic treatment tanks and two aerobic treatment tanks, may be connected, and the decomposition reaction treatments may be carried out. According to this structure, even in the case where the concentration of organic pollutant matter in sewage is high, the decomposition reaction treatment can be carried out without lowering the treatment performance.

Figure 19:
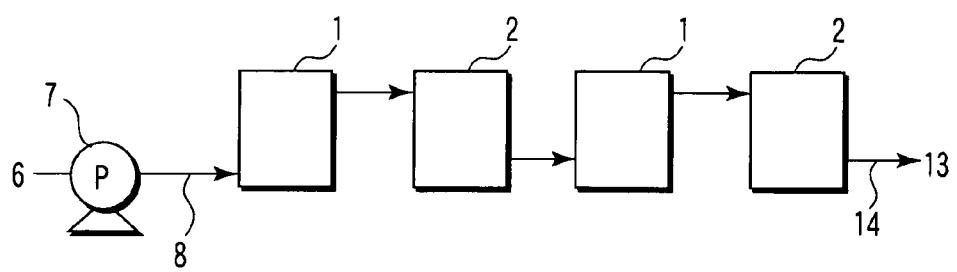
FIG. 19 shows another example of the entire structure of the eighth embodiment of the aeration-less water treatment system according to the invention.

(2) In the above-described embodiment, the two anaerobic treatment tanks 1 are arranged on the former-stage side and the two aerobic treatment tanks 2 are arranged on the latter-stage side. As shown in FIG. 19, for example, anaerobic treatment tanks 1 and aerobic treatment tanks 2 may alternately be arranged in series.

According to this structure, organic pollutant matter, which has not been removed by the combination of the treatment tanks 1 and 2 on the former stage, can be decomposed and removed by the combination of the treatment tanks 1 and 2 on the latter stage. The quality of ultimate treated water can be improved.

In each of the embodiments, the aerobic treatment tanks are disposed in the state in which they are exposed to outside air. However, as needed, the aerobic treatment tank may be installed within a container which has at least an upper part formed of a transparent material. In this case, air windows are properly formed in the container, and the aerobic treatment tank is installed in consideration of not only ambient light, but also air permeability.

The present invention is not limited to the above-described embodiments. Various modifications can be made in practice without departing from the spirit of the invention. The embodiments can be combined as much as possible, and the combined advantages can be obtained in such cases. Furthermore, each embodiment includes inventions in various generic and specific levels, and various inventions can be derived from desired combinations of structural elements disclosed herein. For example, if an invention is extracted by omitting some of all the structural elements in the embodiments, well-known art is properly substituted for the omitted elements in practicing the extracted invention.

What is claimed is:

1. A water treatment system comprising:
    an anaerobic treatment tank which subjects supplied sewage to anaerobic treatment by causing the sewage to upflow by a pump; and
    an aerobic treatment tank which subjects anaerobically treated water, which is supplied to an upper part of the aerobic treatment tank from the anaerobic treatment tank, to aerobic treatment by letting the anaerobically treated water to downflow by natural downflow,
    wherein the aerobic treatment tank includes an aerobic filter bed section in which carriers to which aerobic microorganisms are adhered are arranged, the aerobic filter bed section subjecting the anaerobically treated water to decomposition treatment by putting the anaerobic treatment water in contact with the aerobic microorganisms adhered to surfaces of the carriers, the aerobic filter bed section being provided with an air supply section which takes in air into under normal pressure, thereby activating the aerobic microorganisms.

2. The water treatment system according to claim 1, wherein the air supply section includes a cylindrical air port which is formed horizontal or at a predetermined angle to an outer wall surface part which forms the aerobic filter bed section.

3. The water treatment system according to claim 1, wherein the air supply section includes a diffusion section which is disposed at least at an upper part of the aerobic filter bed section and sprays the anaerobically treated water, which is supplied from the anaerobic treatment tank, to the aerobic filter bed section.

4. A water treatment system comprising:
    an anaerobic treatment tank which subjects supplied sewage to anaerobic treatment by causing the sewage to upflow by a pump; and
    an aerobic treatment tank which subjects anaerobically treated water, which is supplied to an upper part of the aerobic treatment tank from the anaerobic treatment tank, to aerobic treatment by letting the anaerobically treated water to downflow by natural downflow,
    wherein the aerobic treatment tank includes a plurality of divisional aerobic treatment tanks which are arranged in a height direction, each of the divisional aerobic treatment tanks including:
    an aerobic filter bed section in which carriers to which aerobic microorganisms are adhered are arranged; and
    air supply means for causing treated water, which is let to flow down as a downward stream from an upper-stage of said divisional aerobic treatment tank and to pass through the aerobic filter bed section, to flow to a lower-stage of said divisional aerobic treatment tank.

5. The water treatment system according to claim 4, wherein the air supply means includes a diffusion section which is disposed at an upper part of the divisional aerobic treatment tank and sprays the supplied treated water onto the aerobic filter bed section.

6. A water treatment system comprising:
an anaerobic treatment tank which subjects supplied sewage to anaerobic treatment by causing the sewage to upflow by a pump; and
an aerobic treatment tank which subjects anaerobically treated water, which is supplied to an upper part of the aerobic treatment tank from the anaerobic treatment tank, to aerobic treatment by letting the anaerobically treated water to downflow by natural downflow,
wherein the aerobic treatment tank includes a spiral aerobic filter bed section in which carriers to which aerobic microorganisms are adhered are arranged, oxygen in air being taken in the anaerobically treated water by causing the anaerobically treated water to flow in a spiral flow fashion in the spiral aerobic filter bed section.

7. A water treatment system comprising:
an anaerobic treatment tank which subjects supplied sewage to anaerobic treatment by causing the sewage to upflow by a pump; and
an aerobic treatment tank which subjects anaerobically treated water, which is supplied to an upper part of the aerobic treatment tank from the anaerobic treatment tank, to aerobic treatment by letting the anaerobically treated water to downflow by natural downflow,
wherein the aerobic treatment tank includes a stepwise aerobic filter bed section in which carriers to which aerobic microorganisms are adhered are arranged, the anaerobically treated water flowing in the stepwise aerobic filter bed section.

8. The water treatment system according to claim 1, wherein the air supply section includes a plurality of pipes which are provided between an upper part of the anaerobic treatment tank and the aerobic treatment tank and are equipped with valves, respectively, and means for varying a water level of the anaerobically treated water in the aerobic treatment tank by switching opening/closing of the plurality of valves.

9. The water treatment system according to claim 1, further comprising:
a reverse-flow cleaning path which is formed, aside from an ordinary microorganic decomposition treatment path, by connecting the anaerobic treatment tank and the aerobic treatment tank by pipes which are equipped with valves, respectively; and
tank cleaning means for cleaning each of the treatment tanks by passing treatment water through the reverse-flow cleaning path by switching the valves and driving the pump.

10. The water treatment system according to claim 1, wherein a plurality of anaerobic treatment tanks are arranged in series on a front stage side, a plurality of aerobic treatment tanks are arranged in series subsequent to the plurality of anaerobic treatment tanks, and different species of microorganisms are grown in the respective treatment tanks.

11. The water treatment system according to claim 1, wherein a plurality of pairs of the anaerobic treatment tank and the aerobic treatment tank are arranged in series such that the anaerobic treatment tanks and the aerobic treatment tanks are alternately disposed, and different species of microorganisms are grown in the respective treatment tanks.

12. The water treatment system according to claim 4, wherein the plurality of divisional aerobic treatment tanks are arranged with a space area to each other.

* * * * *